March 6, 1934.   R. L. ANDERSON ET AL   1,950,209
COMBINE
Filed May 18, 1933    2 Sheets-Sheet 1
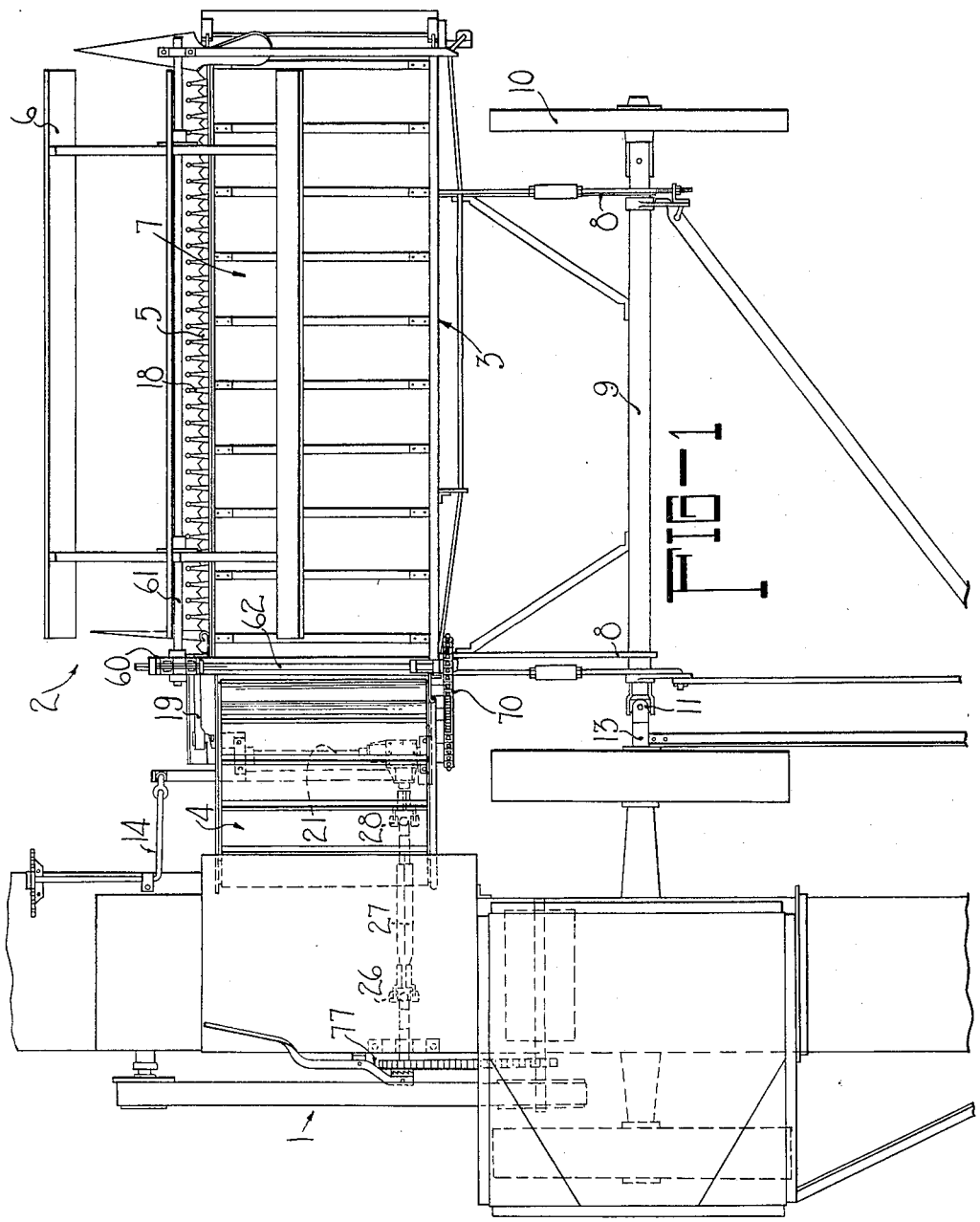
WITNESS.
Edward Melin
INVENTORS
Ralph L. Anderson
Alvin W. Oehler
BY E. C. Bopf ATTORNEY

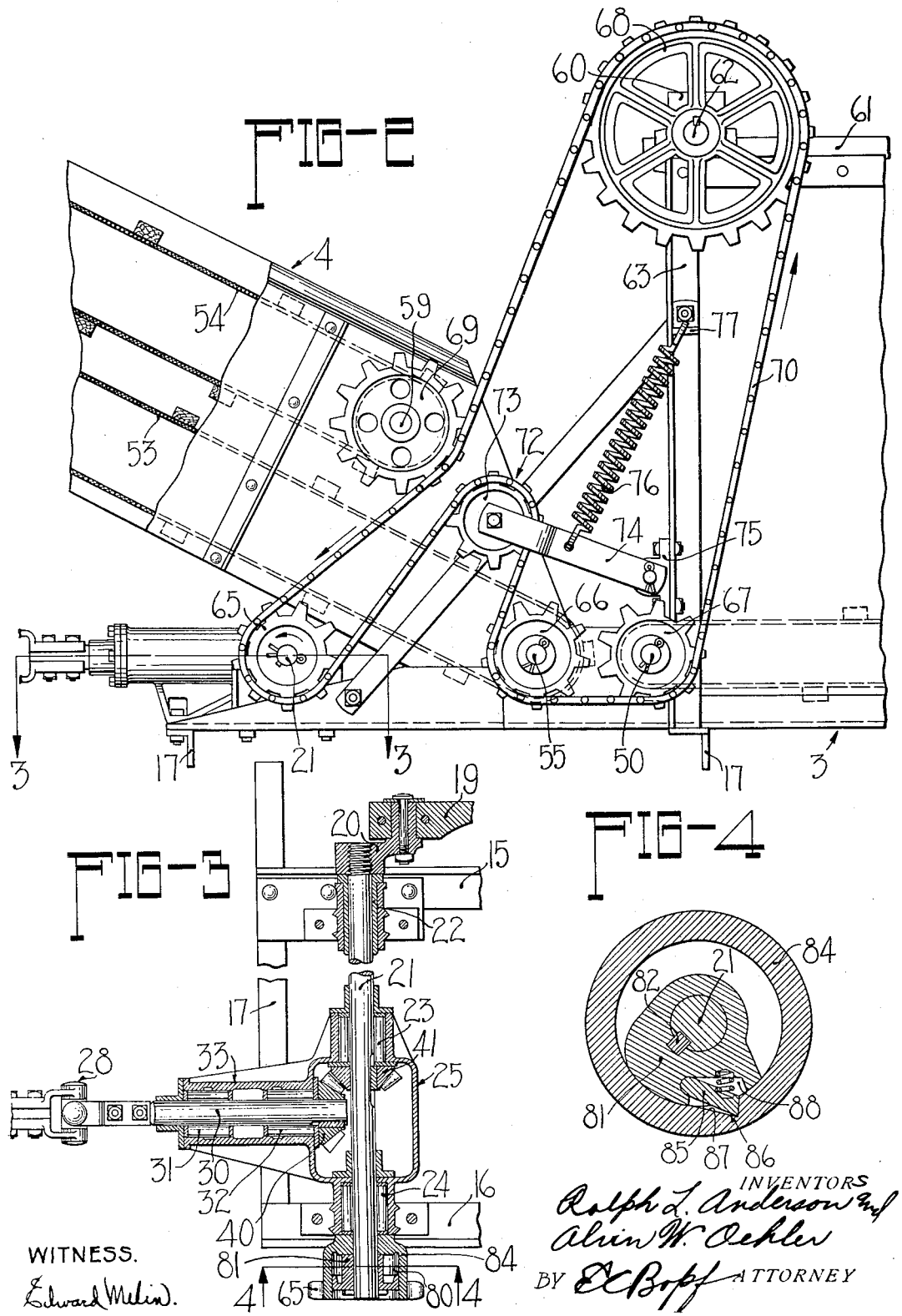

Patented Mar. 6, 1934

1,950,209

UNITED STATES PATENT OFFICE 1,950,209

COMBINE

Ralph L. Anderson and Alvin W. Oehler, Moline, Ill., assignors to Deere & Company, Moline, Ill., a corporation of Illinois Application May 18, 1933, Serial No. 671,645

3 Claims. (Cl. 56—20)

This invention relates to combines and more particularly to those comprising a thresher portion and a harvester portion connected with the thresher portion for vertical movement with respect to the thresher. In combines of this type, the harvester portion usually comprises a laterally extending platform and an inclined conveyor pivotally connected to the inner end of the platform and extending to and supported on the thresher. The platform comprises a reciprocating sickle, a reel and a horizontal conveyor positioned in rear of the sickle and operating to convey the cut crop laterally. The inclined conveyor receives the crop from the horizontal conveyor and conveys it to the thresher.

In combines of this kind it is common to drive the operating mechanism of the harvester including the inclined conveyor through a flexible connection with the prime mover on the thresher and through an interconnection of the mechanisms comprising a single driving chain trained over drive sprockets associated with the separate mechanisms.

Due to the fact that the conveyor is pivotally connected to the platform the length of the circuit around the several sprockets varies when the platform is vertically adjusted with respect to the thresher. This makes it necessary to provide an idler to take up the slack occasioned by this change in the length of the circuit. It is also customary in combines to provide means for disconnecting the drive to the harvester. The sickle being a rapidly reciprocating element, its momentum is absorbed at the end of each stroke, as a result of which it tends to stop reciprocating immediately upon the disconnection of the drive to the harvester. Since the other mechanisms of the harvester including the two conveyors and the reel are uni-directionally operating members, an appreciable momentum is stored in these parts as a result of which they have a tendency to continue movement for an interval after the power to the harvester has been disconnected. This short interval of continued operation of the reel and conveyors produces considerable slack in what is ordinarily the tight side of the chain because the spring on the idler if not of extraordinary tension does not have sufficient tension to continue the operation of the sickle and the drive connections thereto. Then when the power is again applied to the harvester, the slack which has now been provided in the normally tight side of the chain is taken up with a snap, frequently causing the chain to jump the driving sprocket and occasionally causing the driving chain to break. It might be possible to provide the chain tightener with a sufficiently heavy spring to compel the sickle to continue operating until the momentum of the other mechanism has been expended, and thereby maintain the normally tight side of the driving chain under tension at all times. Such a chain tightener, however, would be very unsatisfactory for the reason that it would place the chain under abnormal tension when operating, and impose an undue load on the bearings of the driving and driven shafts.

The main object of this invention is to provide means in the drive interconnecting the several mechanisms of the harvester which will prevent the momentum of the reel and conveyors from producing slack in the normally tight side of the chain, without the use of an abnormally heavy spring on the chain tightener. This has been accomplished by providing an over-running clutch between the shaft operatively connected with the sickle and the sprocket which ordinarily connects that shaft with the operating mechanisms of the harvester. In such an arrangement, when the drive to the harvester is disconnected, the sprocket on the shaft operatively connected with the sickle is free to run ahead, permitting the reel and conveyor to expend their momentum in continued operation, and enabling the idler to take up the slack in the chain during such time. As a result, no slack is produced in the normally tight side of the chain. Thus the possibility of the chain jumping the driving sprocket, and breakage of the chain, due to the sudden take up of the slack in the tight side of the chain when power is again applied, has been eliminated.

Other objects and features of the invention will become apparent from the following specification and drawings in which a preferred embodiment of the invention is described and claimed.

In the drawings—

Figure 1 is a plan view of a harvester thresher to which our invention has been applied;

Figure 2 is an enlarged fragmentary view of the inner end of the platform and the inclined conveyor pivotally connected thereto and the driving connections between the mechanisms thereof;

Figure 3 is a cross-sectional view along the line 3—3 of Figure 2; and,

Figure 4 is a cross-sectional view along the line 4—4 of Figure 3.

The combine illustrated comprises a thresher portion 1 and an inclined harvester portion 2 connected with the thresher portion for vertical movement. The harvester portion comprises a laterally extending platform 3 and an inclined conveyor 4 pivotally connected to the inner end of the platform and extending upwardly and inwardly into the feeder house of the thresher, the upper end of the conveyor resting on the lower edge of the opening in the feeder house. The platform 3 comprises a reciprocating sickle 5 extending along the forward side of the platform, a reel 6, and a horizontal conveyor 7 positioned in rear of the sickle and operating to convey the crop cut by the sickle laterally to the inclined conveyor 4. The inclined conveyor 4 receives the crop from the horizontal conveyor and conveys it into the thresher.

The harvester platform 3 is supported on a pair of arms 8 fixed to a transversely extending member 9 which is supported on its outer end on a wheel 10 and at its inner end is pivotally connected by means of a coupling 11 to the inner end of the wheel supported axle 13 upon which the thresher frame 1 is carried. The harvester platform may be raised and lowered by lifting means 14 connected between the thresher and platform.

The frame of the platform 3 comprises a pair of spaced transversely extending angle members 15 and 16 connected by means of several longitudinally extending angle members 17. The sickle 5 is supported from the front frame member 15 upon a series of guard fingers 18 in the usual manner and is operated by means of a pitman 19. Pitman 19 is pivotally connected to the sickle at one end and to a crank 20 at the other end. Crank 20 is fixed on a drive shaft 21 journaled in a bearing 22 on frame member 15 and in bearings 23 and 24 in a gear housing 25, which is supported on the inner end frame member 17 and rear frame member 16. Shaft 21 is driven from the prime mover of the thresher through a flexible connection including universal joint 26, telescopic connection 27, and universal joint 28.

Universal joint 28 is connected to a short shaft 30 journaled in bearings 31 and 32 supported in sleeve member 33 of gear housing 25. Housing 25 encloses a pair of bevel gears 40 and 41 mounted on the end of shaft 30 and on shaft 21, respectively.

Longitudinal conveyor 7 is of the endless belt type and is trained over rollers at each end of the platform, the inner roller being fixed to a drive shaft 50 journaled in bearings on the frame of the platform. Inclined conveyor 4 comprises two endless belt conveyors 53 and 54, the latter running above the former, and the two operating to convey the cut grain upwardly in between the adjacent runs thereof. Belt conveyor 53 is trained over rollers at each end of the frame of the conveyor, the lower one of which is fixed on a drive shaft 55 which also forms the means for pivotally connecting conveyor 4 to the frame of the platform. Belt conveyor 54 is trained over rollers at each end, the lower roller being fixed to a shaft 59 journaled in the frame of conveyor 4.

Reel 6 is driven through a worm and worm gear housed in housing 60, the worm gear being fixed to reel shaft 61 and the worm being fixed to a drive shaft 62 journaled in bearings supported from the upright framework 63 fixed at its lower end to the frame of the platform.

The conveyor 7, the two belt conveyors comprising conveyor 4, and the reel 6 are driven through a common interconnection from shaft 21. This interconnection comprises a sprocket 65 on shaft 21, a sprocket 66 fixed on shaft 55, a sprocket 67 fixed on shaft 50, a sprocket 68 fixed on shaft 62, and a drive chain 70 encircling sprockets 65, 66, 67 and 68 and passing around the lower side of sprocket 69 fixed on shaft 59. A chain tightener 72 is also provided. This tightener comprises an idler 73 around which the slack side of chain 70 is looped. Idler 73 is journaled on the free end of an arm 74 pivoted on a bracket 75 supported from the framework 63. A tension spring 76 is connected between arm 74 and a bracket 77 on framework 63.

As the harvester is moved vertically with respect to the thresher through the manipulation of the lifting means 14, a pivotal action takes place between conveyor 4 and the platform 3, due to the fact that the upper end of the conveyor is resting on the thresher. When the platform is lowered, conveyor 4 will pivot about shaft 55 relative to the platform in a clockwise direction, looking at Figure 2. This causes sprocket 69 to swing in an arc about the axis of shaft 55 in the same direction. As a result, the circuit around the several driving sprockets is lengthened. Chain tightener 72, however, being supported through its spring 76 compensates for this variation in the length of the circuit. In order to be able to stop the operation of the harvester mechanism independently of the thresher mechanism, a lever controlled clutch 77 is provided in the drive to shaft 21. In order that the momentum of the reel and conveyors be prevented from producing slack in the normally tight side of the chain in attempting to drive the sickle after the power to shaft 21 is disconnected, sprocket 65 is connected to shaft 21 through the intermediary of an over-running clutch 80. This clutch comprises a hub member 81 keyed to shaft 21 by means of a key 82. Sprocket 65 is provided with an enlarged cup-shaped hub 84 in which the over-running clutch is disposed. Member 81 carries a spring pressed dog 85 which is adapted to engage in a V-shaped notch 86 in the inner wall of the cup-shaped hub 84 of the sprocket. Notch 86 is so shaped that when shaft 21 and hub member 81 keyed thereto rotate in a counter-clockwise direction, looking at Figure 4, sprocket 65 will be rotated with it. Sprocket 65, however, is free to rotate counter-clockwise relative to shaft 21, such relative rotation taking place whenever the drive to shaft 21 is interrupted, due to the momentum of the conveyors and reel. In such case the end of dog 85 merely rides up the incline 87 of slot 86 and into the pocket 88 in hub member 81. With sprocket 65 free to rotate counter-clockwise relative to shaft 21, the chain tightener 72 is able to take up the slack in the chain at all times and prevent any slack occurring in the normally tight side of the chain with only a relatively light spring provided for the chain tightener.

In the particular driving interconnection between the several mechanisms of the harvester shown, wherein the drive to the upper one of the two belt conveyors comprising conveyor 4 is driven by a sprocket around the lower side of which the driving chain 70 is trained, a particular difficulty was had until applicants interposed the over-running clutch between the drive sprocket 65 and the shaft 21. Permitting slack to accumulate in the normally tight side of the chain when power to the harvester was interrupted caused the driving chain to disengage from the sprocket 69. Then when power was again applied to the harvester mechanism and the slack in the normally tight side of the chain was suddenly taken up, occasionally the chain failed to engage the under side of sprocket 69 and sometimes engaged the top side of the sprocket causing the upper belt conveyor to run in the wrong direction. By preventing the accumulation of slack in the normally tight side of the chain through the provision of the over-running clutch 80, the chain is at all times held in engagement with sprocket 69, as a result of which the difficulty noted above is entirely eliminated.

What we claim is:—

1. The combination with a combine comprising a thresher, a harvesting platform connected with said thresher for vertical movement with respect to said thresher, a sickle on said platform, a conveyor pivotally connected to said platform and extending to said thresher, a sprocket on said conveyor for driving the same, a shaft on said platform operatively connected with said sickle, and means for driving said shaft, of a sprocket operatively connected with said shaft, a chain connecting said sprockets to drive said conveyor, a yieldingly mounted chain tightener in the slack side of said chain to take up the slack occasioned by the relative movement of said sprockets when the platform is moved vertically with respect to said thresher, an over-running clutch interposed between said last sprocket and said shaft to prevent the momentum of said conveyor from producing slack in the normally tight side of said chain when the drive to said shaft is disconnected, said first sprocket rotating relative to said shaft to enable said chain tightener to take up the slack in said chain during the time the momentum of said conveyor is being expended.

2. In a combine comprising a thresher and a harvester connected with the thresher for vertical movement with respect thereto, said harvester including a harvesting platform and a conveyor pivotally connected to said platform and extending to said thresher, the combination of a driving member on said harvester having mechanism associated therewith tending to cause the driving member to stop suddenly upon interruption of power thereto, means for applying power to said driving member at will, driven mechanism on said harvester, a sprocket on said driving member, a sprocket for driving said driven mechanism, a chain connecting said sprockets, a yieldingly mounted chain tightener in the slack side of said chain, said driven mechanism having a certain momentum tending to cause continued operation thereof for an interval after power to it is interrupted, and an over-running clutch interposed between said driving member and the sprocket thereon to permit the sprocket on said driving member to run ahead when power to said driving member is interrupted and prevent the momentum of said driven mechanism from producing slack in the normally tight side of said chain and permit said chain tightener to take up the slack in the slack side of said chain during the time the momentum of said driven mechanism is being expended.

3. In combination, a driving member, a driven member, sprockets on said members, a driving chain connecting said sprockets, means for applying power to said driving member at will, a yieldingly mounted chain tightener in the slack side of said chain, said driving member having mechanism associated therewith tending to cause said driving member to stop suddenly upon interruption of power thereto, said driven member having a certain momentum tending to cause continued operation thereof for an interval after power to it from said chain is interrupted, and an over-running clutch interposed between said driving member and the sprocket thereon to permit the sprocket on said driving member to run ahead when power to said driving member is interrupted and prevent the momentum of said driven member from producing slack in the normally tight side of said chain and permit said chain tightener to take up the slack in the slack side of said chain during the time the momentum of said driven member is being expended.

RALPH L. ANDERSON.
ALVIN W. OEHLER.